United States Patent
Suitou et al.

(10) Patent No.: US 9,676,247 B2
(45) Date of Patent: Jun. 13, 2017

(54) MOTOR-DRIVEN COMPRESSOR

(75) Inventors: Ken Suitou, Kariya (JP); Kosaku Tozawa, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 555 days.

(21) Appl. No.: 13/432,808

(22) Filed: Mar. 28, 2012

(65) Prior Publication Data
US 2012/0251350 A1 Oct. 4, 2012

(30) Foreign Application Priority Data

Mar. 28, 2011 (JP) ................................. 2011-070330

(51) Int. Cl.
*F04B 35/04* (2006.01)
*B60H 1/00* (2006.01)
(Continued)

(52) U.S. Cl.
CPC ....... *B60H 1/00521* (2013.01); *B60H 1/3229* (2013.01); *F04B 39/0044* (2013.01);
(Continued)

(58) Field of Classification Search
CPC .. F04C 29/06; F04C 29/068; F04C 2230/604; F04B 53/003; F04B 29/60; F04B 29/668; F04B 39/0027; F04B 39/004; F04B 39/12; F04B 39/121; F04B 39/127; B60H 1/00521; B60H 1/00514; B60H 1/3229; B60H 2001/006
(Continued)

(56) References Cited

U.S. PATENT DOCUMENTS 2,751,147 A * 6/1956 Wurtz ........................... 417/363
4,600,367 A * 7/1986 Terauchi et al. .............. 417/360
(Continued)

FOREIGN PATENT DOCUMENTS

DE 199 14 655 A1 10/2000
JP 63-65873 U 4/1988
(Continued)

OTHER PUBLICATIONS

English Translation of JP 2005-220855 (Suzuki).*
Extended European Search Report for corresponding EP Patent Application No. 12161256.8 dated Aug. 3, 2012.

*Primary Examiner* — Dominick L Plakkoottam
*Assistant Examiner* — Connor Tremarche
(74) *Attorney, Agent, or Firm* — Sughrue Mion, PLLC

(57) ABSTRACT

A motor-driven compressor comprises a mounting portion for mounting a housing including a fluid compression mechanism to an attachment section of a vehicle. The mounting portion includes a tubular body, a damping member provided integrally with the tubular body and formed from a resin, a fixing member provided integrally with the damping member and mounting the integrated tubular body and damping member to the housing, and a fastening member mounting the tubular body to the attachment section. The damping member is provided to be interposed between the tubular body and the fixing member, and the fixing member is provided to be interposed between the housing and the damping member.

9 Claims, 6 Drawing Sheets

(51) Int. Cl.
  *F04B 39/12* (2006.01)
  *B60H 1/32* (2006.01)
  *F04B 39/00* (2006.01)
  *F04B 53/00* (2006.01)

(52) U.S. Cl.
  CPC ............ *F04B 39/12* (2013.01); *F04B 39/121* (2013.01); *F04B 39/127* (2013.01); *B60H 2001/006* (2013.01); *F04B 53/003* (2013.01)

(58) Field of Classification Search
  USPC ......... 417/360, 361, 363, 572; 248/65, 74.1, 248/74.2, 74.3, 635, 638; 439/345
  See application file for complete search history.

(56) References Cited

U.S. PATENT DOCUMENTS

| | | | | |
|---|---|---|---|---|
| 4,766,968 A | * | 8/1988 | Matsunaga | 180/68.4 |
| 4,834,336 A | * | 5/1989 | Shimazaki et al. | 248/666 |
| 4,938,448 A | * | 7/1990 | Shimazaki | F16F 15/08 |
| | | | | 248/635 |
| 4,988,071 A | * | 1/1991 | Shimazaki | B60H 1/3229 |
| | | | | 248/606 |
| 4,993,682 A | * | 2/1991 | Imai et al. | 248/638 |
| 5,810,322 A | * | 9/1998 | Zhao et al. | 248/675 |
| 5,938,169 A | * | 8/1999 | Ogawa | F02B 67/06 |
| | | | | 123/195 A |
| 5,964,579 A | * | 10/1999 | Tang et al. | 417/363 |
| 6,132,183 A | * | 10/2000 | Li et al. | 417/363 |
| 6,233,140 B1 | * | 5/2001 | Cummings | G06F 1/1601 |
| | | | | 248/917 |
| 6,360,712 B1 | * | 3/2002 | Banks | F16H 7/14 |
| | | | | 123/195 A |
| 6,543,741 B1 | * | 4/2003 | Li et al. | 248/638 |
| 6,669,452 B2 | * | 12/2003 | Ogawa et al. | 417/360 |
| 6,705,581 B2 | * | 3/2004 | Trago et al. | 248/656 |
| 7,488,789 B2 | * | 2/2009 | Ikenaga | C08L 23/142 |
| | | | | 526/160 |
| 2002/0100855 A1 | * | 8/2002 | Zupan et al. | 248/674 |
| 2002/0131878 A1 | * | 9/2002 | Ogawa | B60K 6/22 |
| | | | | 417/360 |
| 2005/0178604 A1 | * | 8/2005 | Burnham | 180/312 |
| 2010/0224664 A1 | * | 9/2010 | Hishinuma et al. | 224/555 |
| 2011/0243763 A1 | * | 10/2011 | Suitou et al. | 417/363 |
| 2011/0243764 A1 | * | 10/2011 | Tsubai et al. | 417/363 |
| 2011/0243765 A1 | * | 10/2011 | Sugiyama et al. | 417/363 |
| 2011/0243767 A1 | * | 10/2011 | Tozawa et al. | 417/410.1 |
| 2012/0076680 A1 | * | 3/2012 | Bahmata et al. | 417/572 |
| 2012/0214328 A1 | * | 8/2012 | Downing | 439/345 |
| 2012/0251357 A1 | * | 10/2012 | Yokoi et al. | 417/410.1 |

FOREIGN PATENT DOCUMENTS

| | | | |
|---|---|---|---|
| JP | 64-44810 U | | 3/1989 |
| JP | 64-44812 U | | 3/1989 |
| JP | 64-44815 U | | 3/1989 |
| JP | 2000-130330 A | | 5/2000 |
| JP | 2005-220854 A | | 8/2005 |
| JP | 2005-220855 A | | 8/2005 |
| JP | 2005-220856 A | | 8/2005 |
| JP | 2005220855 A | * | 8/2005 |
| JP | 2010-138808 A | | 6/2010 |

* cited by examiner

MOTOR-DRIVEN COMPRESSOR

BACKGROUND OF THE INVENTION

1. Field of the Invention

The invention relates to a motor-driven compressor, and more particularly to a motor-driven compressor to be installed on a vehicle.

2. Description of the Related Art

In a hybrid vehicle that travels by using an engine and an electric motor, the ratio of engine operation mode and electric motor operation mode is changed according to the running state of the vehicle. Where the aforementioned hybrid vehicle is configured such that a compressor that actuates the refrigeration cycle constituting an air conditioner receives drive power from the engine, the compressor cannot receive the required drive power from the engine at all times. Therefore, hybrid vehicles use a motor-driven compressor that is driven by electric power obtained, for example, from a battery installed on the vehicle. The motor-driven compressor is attached to the vehicle body or engine.

However, a hybrid vehicle is sometimes operated only by the electric motor in a state in which the engine is stopped, for example, in an idle reduction mode, and where the motor-driven compressor is operated when the engine is thus stopped, unpleasant noise is generated inside and outside the vehicle due to the operation of the motor-driven compressor. In particular, the main cause of the unpleasant noise is resonance noise generated by vibrations of the vehicle body or engine caused by vibrations of the motor-driven compressor transmitted thereto by the attachment parts of the motor-driven compressor, rather than the noise emitted by the motor-driven compressor itself. Accordingly, attachment structures of the compressor designed to moderate the vibrations transmitted from the motor-driven compressor to the vehicle body or engine have been suggested.

Japanese Utility Model Application Publication No. S64-44810 describes a structure in which a screw is inserted in each through hole of cylindrical mountings attached to a compressor and each screw is screwed into each threaded hole of the attachment body of an engine, thereby mounting the compressor to the attachment body. Further, a vibration-damping rubber is wound about the outer circumferential surface of the cylindrical mounting. In a state in which the cylindrical mountings with the vibration-damping rubber wound thereon are disposed on the inner side of semicircular curl portions of a base mounting, the base mounting is fixed to the outer side of the compressor by screwing and mounting to the compressor. In this case, the vibration-damping rubber is interposed between the base mounting and the cylindrical mounting and between the compressor and the cylindrical mounting.

However, in the compressor described in Japanese Utility Model Application Publication No. S64-44810, the base mounting covered from the outside of the cylindrical mountings is screwed and fixed to the compressor together with the cylindrical mountings, but when the base mounting and the cylindrical mountings are attached to the compressor, the cylindrical mountings and the base mounting should be screwed in a state in which they are disposed and fixed at a predetermined position of the compressor. The resultant problem is that the base mounting and the cylindrical mounting have poor assemblability. Another problem is that in the base mounting that has been fixed by screwing, the screwed joint is loosened by vibrations of the operating compressor and the base mounting and the cylindrical mounting can be separated from the compressor.

SUMMARY OF THE INVENTION

The present invention has been created to resolve the above-described problems, and it is an object of the present invention to provide a motor-driven compressor in which noise can be reduced, assembling can be facilitated, and the assembled state can be stably maintained.

In order to resolve the above-described problems, the present invention provides a motor-driven compressor to be mounted to an attachment section of a vehicle, the motor-driven compressor including: a housing having inside thereof a compression mechanism that is driven by electric power, compresses a fluid suctioned from outside, and then discharges the compressed fluid; and a mounting portion for mounting the housing to the attachment section, wherein the mounting portion has a tubular body, a damping member provided integrally with the tubular body and formed from a resin, a fixing member provided integrally with the damping member and fitted to the housing for mounting the integrated tubular body and damping member to the housing, and a fastening member inserted into the tubular body for mounting the tubular body to the attachment section; the damping member is provided to be interposed between the tubular body and the fixing member; and the fixing member is provided to be interposed between the housing and the damping member.

DESCRIPTION OF THE PREFERRED EMBODIMENTS

The embodiments of the present invention will be described below with reference to the appended drawings.

First Embodiment

The construction of a motor-driven compressor 101 according to a first embodiment of the present invention will be explained below. The below-described embodiment relates to a motor-driven compressor which is attached to an engine 61 that is an internal combustion engine installed on a vehicle.

Figure 1:
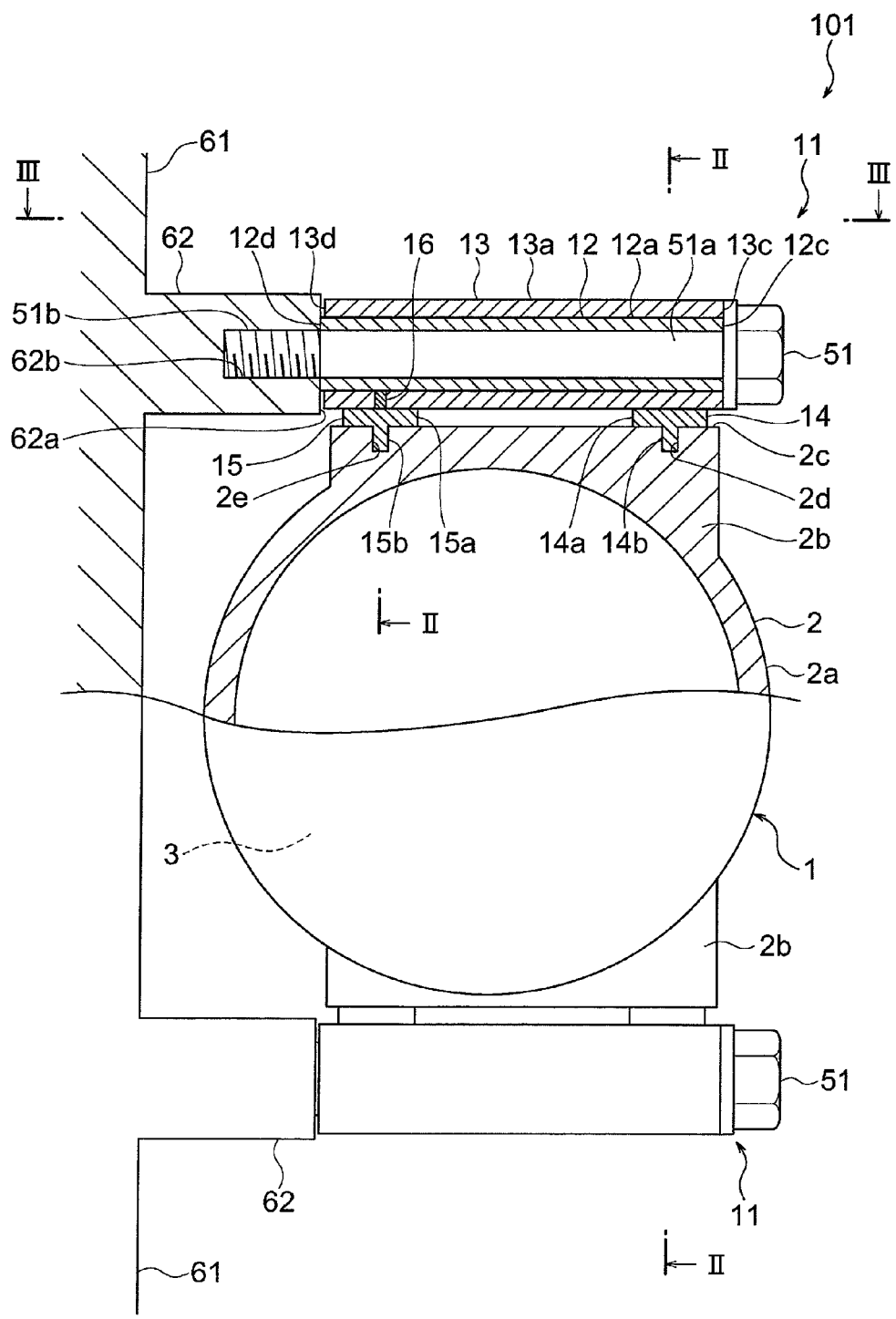
FIG. 1 is a schematic diagram illustrating the construction of a motor-driven compressor according to a first embodiment of the present invention.

First, referring to FIG. 1, the motor-driven compressor 101 is provided with a compressor main body 1 and mounting portions 11 that are mounting portions to be attached to the compressor main body 1.

The compressor main body 1 includes a housing 2 of a cylindrical shape and a compression mechanism 3 (not shown in the figure) located inside the housing 2. The compression mechanism 3 is driven by electric power, suctions a fluid such as a refrigerant from the outside, compresses the suctioned fluid, and then discharges the compressed fluid to the outside. The housing 2 is formed, for example, from a metal such as an aluminum alloy.

A mounting base 2b serving to mount the mounting portions 11 is integrally formed from the same material as the housing 2 and protrudes from both sides of a cylindrical outer surface 2a of the housing 2. The mounting base 2b includes a flat surface 2c for mounting the mounting portion 11 and also includes mounting holes 2d and 2e, which are cylindrical recesses, at the surface 2c. The holes 2d and 2e are formed so as to be arranged in a row in the direction perpendicular to the cylinder axis of the housing 2.

Further, the mounting portion 11 includes a metal tubular member 12 of a cylindrical shape and also a substantially cylindrical damping member 13 formed on the outer circumferential surface 12a of the tubular member 12 so as to surround the outer circumferential surface 12a. The tubular member 12 is formed, for example, from a metal such as an aluminum alloy. The tubular member 12 constitutes a tubular body.

The damping member 13 is formed from a resin having good adhesion to metals, a good vibration damping property, that is, vibration suppression ability, and rigidity. A material with a flexural modulus of 100 MPa to 10,000 MPa can be used as the resin for forming the above-mentioned damping member 13. Examples of materials that can be used as the resin for forming the damping member 13 include PP (polypropylene), PBT (polybutylene terephthalate, that is, a PBT resin), PVC (vinyl chloride resin, that is, polyvinyl chloride), PUR (polyurethanes), PTFE (fluororesin), PF (phenolic resins), PC (polycarbonates), PA (polyamides, that is, Nylon), ABS (ABS resins), carbon plastics, and mixtures thereof. Fiber-reinforced plastics (FRP) also may be used as the resin forming the damping member 13.

It is further preferred that a loss factor representing a vibration damping property of the resin forming the damping member 13 be larger than that of the metal forming the housing 2 and the tubular member 12, for example, 0.01 to 1. For example, the loss factor of an aluminum alloy which is an example of the metal forming the housing 2 and the tubular member 12 is 0.0001.

Further, end portions 13c and 13d in the longitudinal, that is, axial, direction of the damping member 13 are formed such as not to protrude beyond end portions 12c and 12d in the longitudinal, that is, axial, direction of the tubular member 12. Thus, the damping member 13 is formed such that the length thereof in the axial direction is equal to or less than the length of the tubular member 12 in the axial direction. In other words, the axial end portion 12c and/or 12d of the tubular member 12 is at the same position as the axial end portions 13c, 13d of the damping member 13 and/or protrudes beyond the end portions 13c, 13d.

Further, a first fixing jig 14 and a second fixing jig 15 are provided integrally in a row along the cylinder axis direction of the tubular member 12 on the outer peripheral surface 13a of the damping member 13. In other words, the damping member 13 is interposed between the tubular member 12 and the two fixing jigs, namely, the first fixing jig 14 and the second fixing jig 15, thereby preventing the tubular member 12 from coming into contact with the first fixing jig 14 and the second fixing jig 15. The first fixing jig 14 and the second fixing jig 15 are formed from a metal, preferably from a metal material different from that of the housing 2. The reason therefor will be described below. In such configuration, the first fixing jig 14 and the second fixing jig 15 constitute fixing members.

Figure 2:
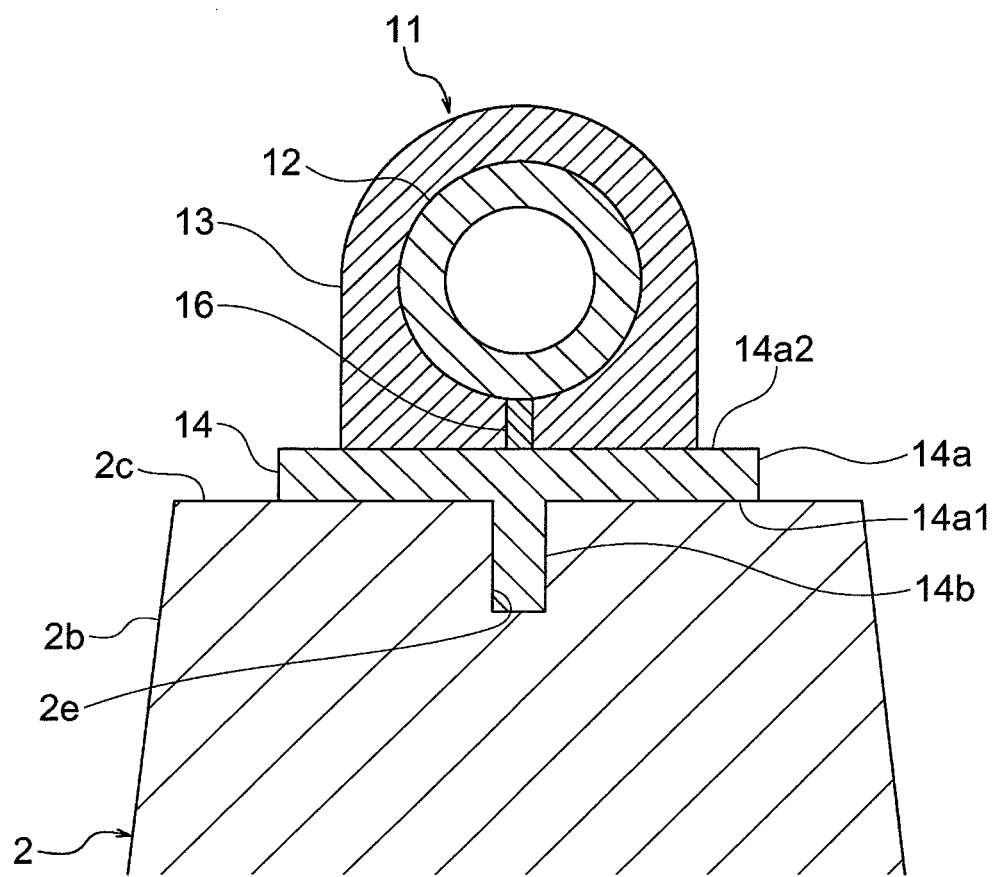
FIG. 2 illustrates part of a cross section taken along the II-II line in FIG. 1.

Referring to FIG. 2, the first fixing jig 14 includes a press-fitted seat portion 14a in the form of a rectangular plate and a press-fitted portion 14b in the form of a round rod protruding from a flat surface 14a1 of the press-fitted seat portion 14a. The first fixing jig 14 is mounted integrally to the damping member 13 and supports the damping member 13 at another flat surface 14a2 of the press-fitted seat portion 14a. Further, the press-fitted seat portion 14a is mounted to the damping member 13 so that zones close to both ends of the flat surface 14a2 protrude to the outside of the damping member 13.

Further, returning to FIG. 1, the second fixing jig 15 is configured similarly to the first fixing jig 14 and includes a press-fitted seat portion 15a in the form of a rectangular plate and a press-fitted portion 15b in the form of a round rod protruding from the press-fitted seat portion 15a. The press-fitted seat portion 15a is mounted integrally to the damping member 13 and supports the damping member 13. Further, the press-fitted seat portion 15a is mounted to the damping member 13 so that zones close to both ends of the press-fitted seat portion 15a protrude to the outside of the damping member 13. The press-fitted seat portions 14a and 15a constitute support portions, and the press-fitted portions 14b and 15b constitute protruding portions.

Further, the first fixing jig 14 and the second fixing jig 15 have shapes such that the press-fitted portions 14b and 15b can fit into the holes 2d and 2e of the mounting base 2b and are configured and arranged to be aligned with the holes 2d and 2e.

In the mounting portion 11, a ground member 16 that connects the tubular member 12 and the second fixing jig 15 is provided integrally inside the damping member 13. The ground member 16 is constituted by a wire-like or thin foil-like member made from a metal or the like, so as to have electric conductivity and flexibility similar to that of the damping member 13. The ground member 16 thus electrically connects the tubular member 12 to the second fixing jig 15. In this configuration, the ground member 16 constitutes a conductive member.

The tubular member 12, damping member 13, first fixing jig 14, second fixing jig 15, and ground member 16 are formed integrally by using a resin molding method such as an insert molding method, thereby forming the mounting portion 11.

The mounting portion 11 formed by integrally molding the tubular member 12, damping member 13, first fixing jig 14, second fixing jig 15, and ground member 16 is mounted and fixed to the mounting base 2b by putting the press-fitted portion 14b of the first fixing jig 14 and the press-fitted portion 15b of the second fixing jig 15 on the holes 2d and 2e, respectively, of the mounting base 2b, applying a press fitting load to the press-fitted seat portion 14a of the first fixing jig 14 and the press-fitted seat portion 15a of the second fixing jig 15 by using a press fitting machine, and press fitting the press-fitted portions 14b and 15b into the holes 2d and 2e. In this case, the mounting portion 11 is restricted and cannot move in the parallel direction and the rotation direction with respect to the housing 2.

In order to prevent the press-fitted portion 14b of the first fixing jig 14 and the press-fitted portion 15b of the second fixing jig 15 from fusing and being stuck to the mounting base 2b inside the holes 2d and 2e during press fitting, it is preferred, as mentioned hereinabove, that the first fixing jig 14 and the second fixing jig 15 be formed from a metal dissimilar to that of the mounting base 2b, that is, the housing 2.

In the motor-driven compressor 101 in which the mounting portion 11 is mounted to the housing 2, the damping member 13 is inserted between the tubular member 12 and the mounting base 2b, and the tubular member 12 does not come into contact with the housing 2. Further, in a state in which the press-fitted portion 14b of the first fixing jig 14 and the press-fitted portion 15b of the second fixing jig 15 are respectively press fitted into the holes 2d and 2e of the mounting base 2b, the first fixing jig 14 and the second fixing jig 15 are positioned to be interposed between the damping member 13 and the mounting base 2b.

Figure 3:
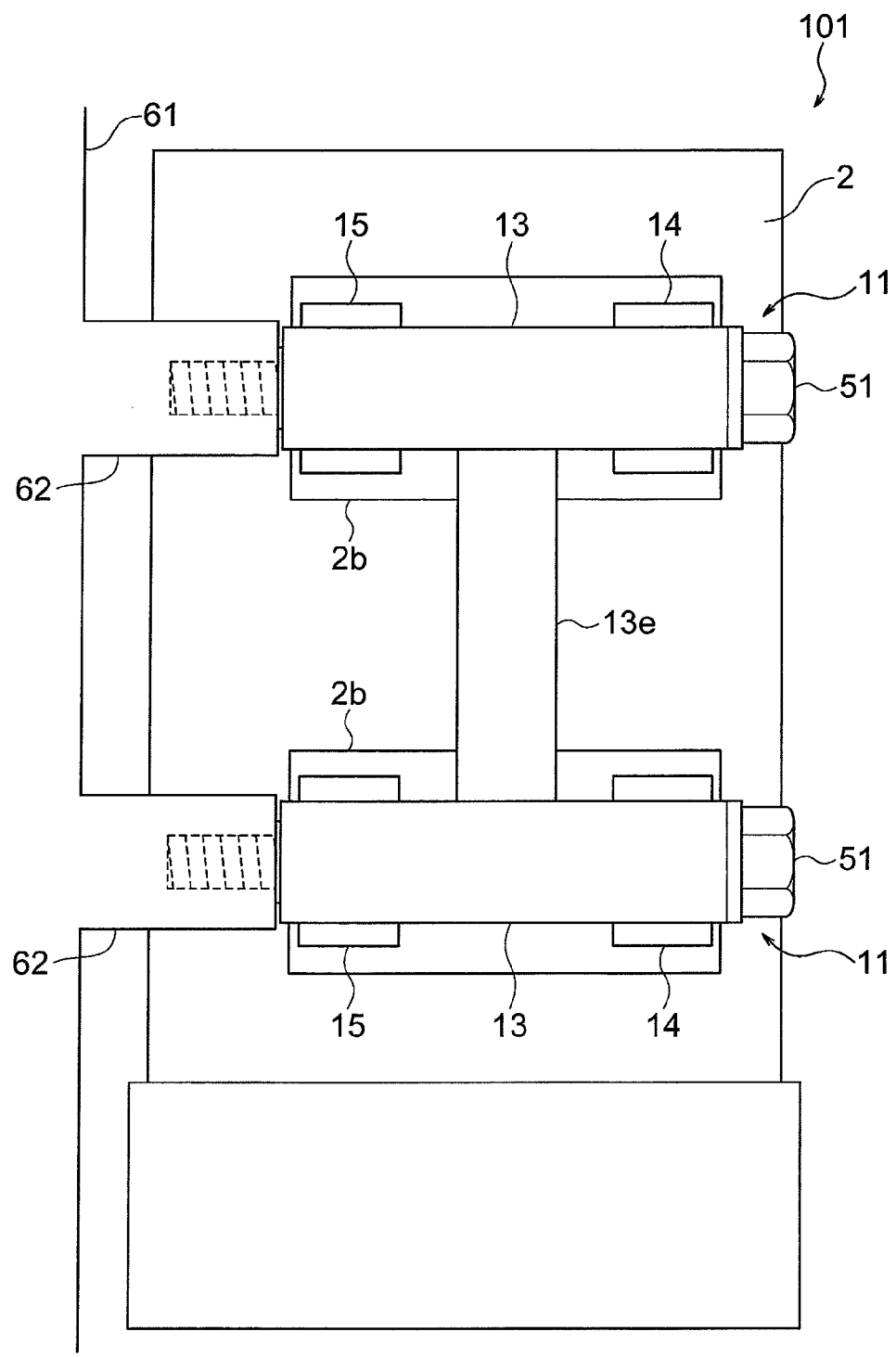
FIG. 3 is a side view taken along the line in FIG. 1.

Further, referring to FIG. 3, the mounting portions 11 are provided by two on each side of the housing 2. Two adjacent mounting portions 11 are connected together and integrated by a resin connection portion 13e formed integrally with respective damping members 13. The connection portion 13e is molded together with the damping members 13 when the mounting portions 11 are obtained by molding a resin.

Referring again to FIG. 1, compressor attachment bases 62 of a round rod-like shape are formed at the engine 61 that is installed in the vehicle (not shown) and has the motor-driven compressor 101 mounted thereto. Further, in an attachment surface 62a at the end of the compressor attachment base 62, a threaded hole 62b including an internal female thread is formed to extend from the attachment surface 62a in the direction of round rod axis of the compressor attachment base 62. The compressor attachment bases 62 constitute an attachment section of the vehicle.

Therefore, the motor-driven compressor 101 having the mounting portions 11 is attached to the engine 61 by fixing the mounting portions 11 to the compressor attachment bases 62.

When the mounting portion 11 of the motor-driven compressor 101 is fixed to the compressor attachment bases 62, the end portion 12d of the tubular member 12 of the mounting portion 11 is brought into contact with an attachment surface 62a of a compressor attachment base 62, and in this state a fastener 51 such as a bolt including a male thread 51b on a shaft 51a is inserted into the tubular member 12. Further, the male thread 51b of the fastener 51 protruding from the end portion 12d of the tubular member 12 is screwed into the female thread of the threaded hole 62b of the compressor attachment base 62, and the tubular portion 12 is fastened to the compressor attachment base 62 by the fastener 51. As a result, the mounting portions 11 are fixed to the compressor attachment bases 62. The fastener 51 is made from a metal. In this configuration the fastener 51 constitutes a fastening member.

In a state in which the mounting portion 11 of the motor-driven compressor 101 is mounted to the compressor attachment base 62, the end portions 12c and 12d of the tubular member 12 are respectively abutted on the fastener 51 and the attachment surface 62a of the compressor attachment base 62, and the tubular member 12 supports the compressive force created by fastening of the fastener 51. The damping member 13 does not receive the compressive force created by the fastener 51. Further, the compressor attachment base 62 is electrically connected by the tubular member 12, ground member 16, and second fixing jig 15 to the mounting base 2b, that is, to the housing 2.

The operation of the motor-driven compressor 101 according to the first embodiment of the present invention is described below.

When the motor-driven compressor 101 is started, the compression mechanism 3 (not shown in the figure) located inside the housing 2 is actuated and the housing 2 vibrates due to the operation of the compression mechanism 3. Vibrations of the housing 2 are transmitted to the damping member 13 by the attachment surface 2c of the mounting base 2b and also the first fixing jig 14 and the second fixing jig 15. Since the damping member 13 has a high loss factor, the vibrations transmitted to the damping member 13 are attenuated inside the damping member 13, and the transmission of vibrations to the tubular member 12, which is in contact with the damping member 13, is suppressed. Further, even though the damping member 13 is in contact with the fastener 51 or the compressor attachment base 62, since the vibrations transmitted to the damping member 13 are attenuated, the transmission of vibrations to the fastener 51 and the compressor attachment base 62 is suppressed.

Therefore, the vibrations of the housing 2 are prevented from being transmitted to the engine 61, and the transmission of the vibrations of the housing 2 to the vehicle body (not shown) via the engine 61 is inhibited.

Further, since the damping member 13 is formed from a resin material with a flexural modulus of 100 MPa to 10,000 MPa and has high rigidity, deformation generated in the damping member 13 by the vibrations of the housing 2 is suppressed. As a result, the housing 2 is prevented from displacing with respect to the compressor attachment base 62, and an increase in the amplitude of vibrations of the housing 2 is inhibited.

As described hereinabove, the motor-driven compressor 101 according to the present invention is mounted to the compressor attachment bases 62 of a vehicle. The motor-driven compressor 101 is provided with the housing 2 including inside thereof the compressor mechanism 3 that is driven by electric power and compresses a fluid suctioned from the outside and then discharges the compressed fluid, and the mounting portions 11 for mounting the housing 2 to the compressor attachment bases 62. The mounting portions 11 include the tubular member 12, the damping member 13 provided integrally with the tubular member 12 and formed from a resin, the first fixing jig 14 and the second fixing jig 15 that are provided integrally with the damping member 13 and serve to mount the integrated tubular member 12 and damping member 13 to the housing 2, and the fastener 51 that is inserted into the tubular member 12 and serves to mount the tubular member 12 to the compressor attachment base 62. The damping member 13 is provided so as to be interposed between the tubular member 12 and the fixing jigs, namely, the first fixing jig 14 and the second fixing jig 15. The first fixing jig 14 and the second fixing jig 15 that are mounted to the housing 2 are positioned to be interposed between the housing 2 and the damping member 13.

The damping member 13 constituted by a resin with a high vibration damping property and either the first fixing jig 14 or the second fixing jig 15 are inserted in the order of description between the tubular member 12, which is in contact with the compressor attachment base 62, and the housing 2. As a result, vibrations generated from the housing 2 and transmitted to the mounting portion 11 are entirely transmitted by the first fixing jig 14 or the second fixing jig 15 to the damping member 13 and attenuated by the damping member 13. Therefore, vibrations transmitted from the motor-driven compressor 101 to the vehicle through the engine 61 can be reduced, thereby making it possible to reduce the resonance noise in the vehicle. Further, in the motor-driven compressor 101, the mounting portion 11 is mounted to the housing 2 by mounting the first fixing jig 14 and the second fixing jig 15 together with the housing 2. Therefore, the mounting portion 11 can be easily mounted to the housing 2. In addition, the first fixing jig 14 and the second fixing jig 15 have a reduced probability of separation caused by the mounted state being loosened by vibrations of the compressor main body 1 during operation. In other words, the motor-driven compressor 101 has a reduced noise level, can be easily assembled, and can maintain the assembled state with good stability.

Further, with the motor-driven compressor 101, the resonance noise in the vehicle can be reduced. Therefore, since the motor-driven compressor 101 may include a small-capacity compression mechanism 3 and be used for high-speed operation, the motor-driven compressor 101 can be reduced in size and cost.

Furthermore, in the motor-driven compressor 101, the housing 2 and the mounting portions 11 are separate parts. Therefore, it is not necessary to design the housing 2 individually to match the arrangement of the compressor attachment bases 62, and a common housing can be used for installation on various vehicles with different arrangements of compressor attachment bases 62, thereby making it possible to reduce costs.

Further, in the motor-driven compressor 101, the damping member 13 of the mounting portion 11 can be provided with a vibration suppression characteristic matching the resonance characteristic of the vehicle, where the motor-driven compressor 101 is installed, by changing the type of resin constituting the damping member 13.

In addition, in the motor-driven compressor 101, the first fixing jig 14 and the second fixing jig 15 are positioned to be interposed between the housing 2 and the damping member 13 in a state of being mounted to the housing 2. Therefore, the first and second fixing jigs 14 and 15 can be formed so as not to protrude to the outside of the housing 2, tubular member 12, and damping member 13. As a result, the number of parts of the motor-driven compressor 101 that protrude to the outside can be reduced and therefore the installation space can be reduced.

Further, in the mounting portion 11 of the motor-driven compressor 101, the resin forming the damping member 13 has a vibration damping property superior to the vibration damping property of the material forming the housing 2. As a result, vibrations transmitted from the housing 2 to the damping member 13 can be effectively attenuated.

Further, in the mounting portion 11 of the motor-driven compressor 101, the tubular member 12 and the first fixing jig 14 and second fixing jig 15 are each made from a metal, and the tubular member 12 supports the fastening force created by the fastener 51 between the compressor attachment base 62 and the fastener 51. In this case, the compressive force created by fastening with the fastener 51 can be prevented from acting upon the damping member 13. Therefore, the compressive force acting upon the damping member 13 can be reduced. As a consequence, fatigue and creep occurring in the damping member 13 due to the compressive force can be reduced. Further, since the fastening force of the fastener 51 can be increased, the tubular member 12 can be more firmly fixed to the compressor attachment base 62. In addition, when the axial end portions 12c and 12d of the tubular member 12 are formed to protrude in the axial direction of the tubular member 12 to the outside of the end portions 13c and 13d of the damping member 13, the tubular member 12 can reliably support the fastening force created by the fastener 51 between the compressor attachment base 62 and the fastener 51, without causing this fastening force to act upon the damping member 13.

Further, in the motor-driven compressor 101, the housing 2 includes the holes 2d and 2e in the outer surface 2a, and the first fixing jig 14 and the second fixing jig 15 respectively include press-fitted seat portions 14a and 15a where the damping member 13 is provided and press-fitted portions 14b and 15b that protrude from the press-fitted seat portions 14a and 15a and can be fit in the holes 2d and 2e. The first fixing jig 14 and the second fixing jig 15 are respectively mounted to the housing 2 by applying a compressing force for press fitting to the press-fitted seat portions 14a and 15a and press fitting the press-fitted portions 14b and 15b to the holes 2d and 2e. Therefore, the mounting portions 11 can be easily attached to the housing 2 by a press fitting operation of the respective press-fitted portions 14b and 15b of the first fixing jig 14 and the second fixing jig 15. The mounting portions 11 that have been mounted by press fitting are firmly fixed to the housing 2.

Further, in the motor-driven compressor 101, the mounting portion 11 has a flexible and conductive ground member 16 that electrically connects the tubular member 12 to the second fixing jig 15. In this case, where the tubular member 12 and the second fixing jig 15 are each made from a metal, the housing 2 can be electrically connected to the compressor attachment base 62, that is, to the engine 61, by the second fixing jig 15, ground member 16, and tubular member 12 when the motor-driven compressor 101 is mounted to the compressor attachment base 62. Therefore, the operation of grounding becomes unnecessary when the motor-driven compressor 101 is mounted to the engine 61 and, due to the decreased number of operations, the costs can be reduced.

Further, in the mounting portion 11 of the motor-driven compressor 101, the damping member 13 is formed from a resin with a flexural modulus of 100 MPa to 10,000 MPa. By increasing the flexural modulus of the damping member 13, it is possible to increase the rigidity thereof, thereby making it possible to suppress the displacement of the vibrating compressor main body 1 and prevent an increase in amplitude of vibrations of the compressor main body 1.

Second Embodiment

Although, in the mounting portion 11 of the motor-driven compressor 101 of the first embodiment, two fixing jigs, namely the first fixing jig 14 and the second fixing jig 15, are mounted to one damping member 13, in a motor-driven compressor 201 according to a second embodiment of the present invention, the first fixing jig 14 and the second fixing jig 15 are respectively mounted to a first damping member 213a and a second damping member 213b, which are separate parts and slidable with respect to the tubular member 12.

In the below-described embodiment, reference numerals identical to those in the above-mentioned drawings denote identical or similar constituent elements. Therefore, detailed explanation thereof is herein omitted.

Figure 4:
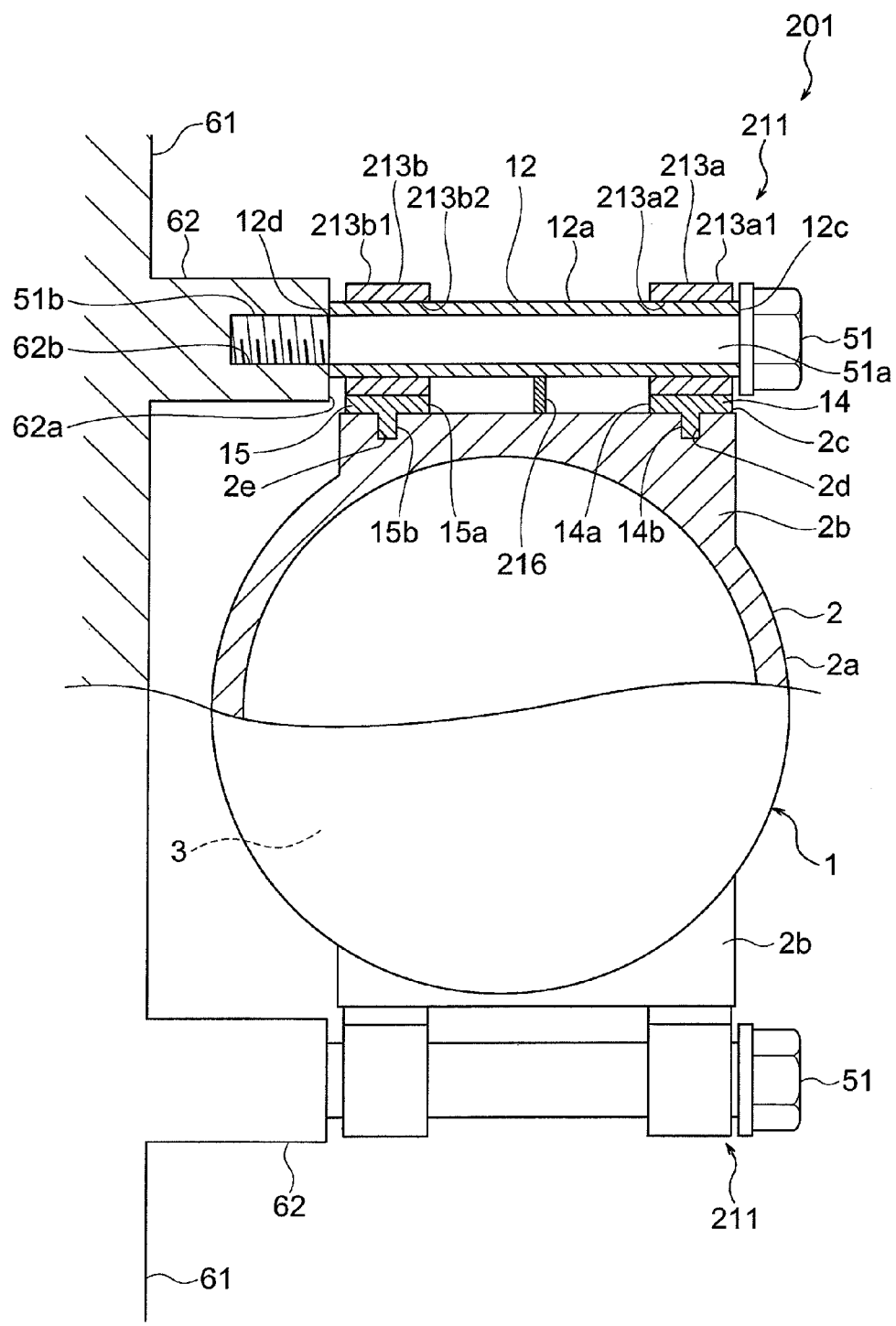
FIG. 4 is a schematic diagram illustrating the construction of a motor-driven compressor according to a second embodiment of the present invention.

Referring to FIG. 4, a mounting portion 211 of the motor-driven compressor 201 includes a substantially cylindrical first damping member 213a and a second damping member 213b formed on the outer circumferential surface 12a of the tubular member 12 so as to surround the outer circumferential surface 12a. The first damping member 213a and the second damping member 213b are formed separately from each other and can slide with respect to the tubular member 12 in the direction along the cylinder axis of the tubular member 12. In other words, the first damping member 213a and the second damping member 213b are molded from the same material as the damping member 13 of the first embodiment, but are not molded integrally with the tubular member 12, as the damping member 13. Instead, the first and second damping members 213a and 233b are integrally provided with the tubular member 12 by mounting inner peripheral surfaces 213a2 and 213b2 thereof on the outer circumferential surface 12a of the tubular member 12.

Further, the first fixing jig 14 and the second fixing jig 15 are respectively mounted by integral molding to an outer peripheral surface 213a1 of the first damping member 213a and an outer peripheral surface 213b1 of the second damping member 213b.

Further, an end portion of a ground member 216 is connected to the outer circumferential surface 12a of the tubular member 12 between the first damping member 213a and the second damping member 213b.

As a result, in the mounting portion 211, by moving the first damping member 213a and the second damping member 213b, the press-fitted portion 14b of the first fixing jig 14 and the press-fitted portion 15b of the second fixing jig 15 are respectively aligned with and put on the holes 2d and 2e of the mounting base 2b of the housing 2 and they are press fitted into the attachment holes 2d and 2e, thereby mounting and fixing the mounting portion 211 to the mounting base 2b. In this case, the mounting portion 211 is restricted and cannot move in a direction parallel to or in rotation with the housing 2. In addition, the unconnected other end portion of the ground member 216 extending from the tubular member 12 is connected to the mounting base 2b.

As a result, in a state in which the motor-driven compressor 201 is fixed to the compressor attachment bases 62, the end portions 12c and 12d of the tubular member 12 are respectively abutted on the fastener 51 and the attachment surface 62a of a compressor attachment base 62, and the compressive force created by fastening of the fastener 51 is supported by the tubular member 12. Further, vibrations of the housing 2 are transmitted to the first damping member 213a and the second damping member 213b by the attachment surface 2c of the mounting base 2b and the first or second fixing jig 14 or 15, respectively. The vibrations transmitted to the first damping member 213a and the second damping member 213b are attenuated inside the respective damping members and prevented from being transmitted to the engine 61 by the tubular member 12, fastener 51, and compressor attachment base 62. In this case, the housing 2 is electrically connected to the compressor attachment base 62, that is, the engine 61, by the ground member 216 and the tubular member 12.

Other features and operation of the motor-driven compressor 201 according to the second embodiment of the present invention are similar to those of the first embodiment and the explanation thereof is herein omitted.

As described hereinabove, the effects obtained with the motor-driven compressor 201 of the second embodiment are similar to those obtained with the motor-driven compressor 101 of the aforementioned first embodiment.

Further, in the motor-driven compressor 201, the first damping member 213a and the second damping member 213b in the mounting portion 211 are provided on the tubular member 12 so as to be movable in the axial direction of the tubular member 12. As a result, the first damping member 213a and the second damping member 213b can be moved so as to align the press-fitted portion 14b of the first fixing jig 14 and the press-fitted portion 15b of the second fixing jig 15 with the respective holes 2d and 2e of the mounting base 2b of the housing 2, and then the mounting portion 211 can be mounted to the housing 2. Therefore, it is not necessary to fabricate the mounting portions 211 individually according to various housings 2 that differ from each other in the distance between the holes 2d and 2e, and the generality of the mounting portion 211 is improved. As a result, the costs of the motor-driven compressor 201 can be reduced.

Further, in the motor-driven compressor 201, the first damping member 213a and the second damping member 213b are movable in the axial direction of the tubular member 12, but either the first damping member 213a or the second damping member 213b may be molded integrally with the tubular member 12 and fixed to the tubular member 12. As a result, the housing 2 can be kept from moving integrally with the first damping member 213a and the second damping member 213b with respect to the tubular member 12 along the cylinder axis thereof.

Further, in the mounting portion 211 of the motor-driven compressor 201, the ground member 216 may be embedded in the first damping member 213a or the second damping member 213b in the same manner as in the mounting portion 11 of the motor-driven compressor 101 of the first embodiment.

Third Embodiment

In a motor-driven compressor 301 according to a third embodiment of the present invention, the first fixing jig 14 and the second fixing jig 15 in the mounting portion 11 of the motor-driven compressor 101 of the first embodiment are configured as a single fixing jig 314.

Figure 5:
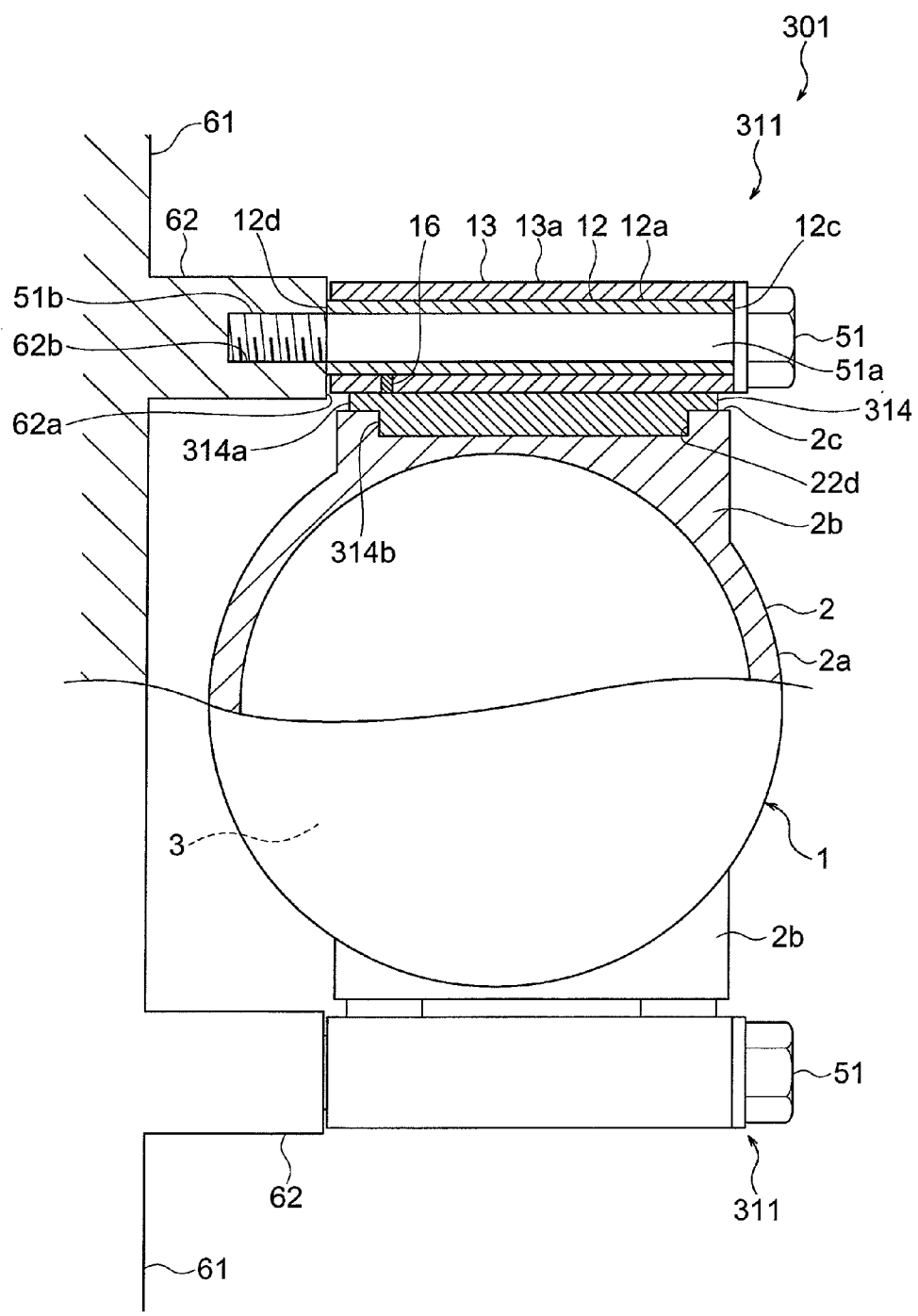
FIG. 5 is a schematic diagram illustrating the construction of a motor-driven compressor according to a third embodiment of the present invention.

Referring to FIG. 5, similarly to the mounting portion 11 of the motor-driven compressor 101 of the first embodiment, a mounting portion 311 of the motor-driven compressor 301 includes a substantially cylindrical damping member 13 integrated on the outer circumferential surface 12a of the tubular member 12 and also includes a fixing jig 314 integrated on the outer peripheral surface 13a of the damping member 13.

The fixing jig 314 includes a press-fitted seat portion 314a in the form of a rectangular plate extending along the cylinder axis of the tubular member 12 and a rib-like press-fitted portion 314b having a rectangular cross section and protruding from the press-fitted seat portion 314a. The press-fitted portion 314b extends along the cylinder axis of the tubular member 12.

A groove 22d that has a rectangular cross section and extends in a direction perpendicular to the cylinder axis of the housing 2 is formed in the attachment surface 2c of the mounting base 2b of the housing 2. The groove 22d has a shape that can fit on the press-fitted portion 314b.

Further, inside the damping member 13, the mounting portion 311 has an integrated ground member 16 that connects the tubular member 12 and the fixing jig 314.

Therefore, where the press-fitted portion 314b of the fixing jig 314 is press fitted into the groove 22d of the mounting base 2b of the housing 2, the mounting portion 311 is attached and fixed to the mounting base 2b. In this case, the mounting portion 311 is restricted and cannot move in a direction parallel to or in rotation with the housing 2.

As a result, in a state in which the motor-driven compressor 301 is fixed to the compressor attachment bases 62, the end portions 12c and 12d of the tubular member 12 are respectively abutted on the fastener 51 and the attachment surface 62a of the compressor attachment base 62, and the tubular member 12 supports the compressive force created by fastening of the fastener 51. Vibrations of the housing 2 are transmitted to the damping member 13 by the mounting base 2b and the fixing jig 314. The vibrations transmitted to the damping member 13 are attenuated inside the damping member 13, and the transmission of vibrations to the engine 61 by the tubular member 12, fastener 51, and compressor attachment base 62 is suppressed. Further, in this case, the housing 2 is electrically connected to the compressor attachment base 62, that is, the engine 61, by the fixing jig 314, ground member 16 and tubular member 12.

Other features and operations of the motor-driven compressor 301 according to the third embodiment of the present invention are similar to those of the first embodiment and the explanation thereof is herein omitted.

As described hereinabove, the effects obtained with the motor-driven compressor 301 of the third embodiment are similar to those obtained with the motor-driven compressor 101 of the aforementioned first embodiment.

Further, in the motor-driven compressor 301, the press-fitted portion 314b of the fixing jig 314 is formed as a rib extending in the direction of the cylinder axis of the tubular member 12, and the mounting portion 311 is mounted to the housing 2 by press fitting the press-fitted portion 314b into the groove 22d of the mounting base 2b of the housing 2. Therefore, the mounting portion 311 can be more firmly attached to the housing 2. Furthermore, sufficient attachment strength of the mounting portion 311 can be obtained even when the groove 22d is shallow. As a result, it is possible to decrease the thickness of the mounting base 2b of the housing 2 and decrease the weight of the motor-driven compressor 301.

In the mounting portions 11, 211 and 311 of the first to third embodiments, the compressive force created by fastening of the fastener 51 is supported by the metallic tubular member 12, but such configuration is not limiting. The tubular member 12 may also be made from a resin that has a loss factor larger than that of the metal constituting the housing 2 and also has a compressive strength capable of withstanding the compressive force created by fastening of the fastener 51. Further, in the mounting portions 11 and 311 of the first and third embodiments, the aforementioned resin tubular member 12 and the damping member 13 may be integrated into a single member. As a result, due to the decreased number of parts, the costs can be reduced.

Figure 6:
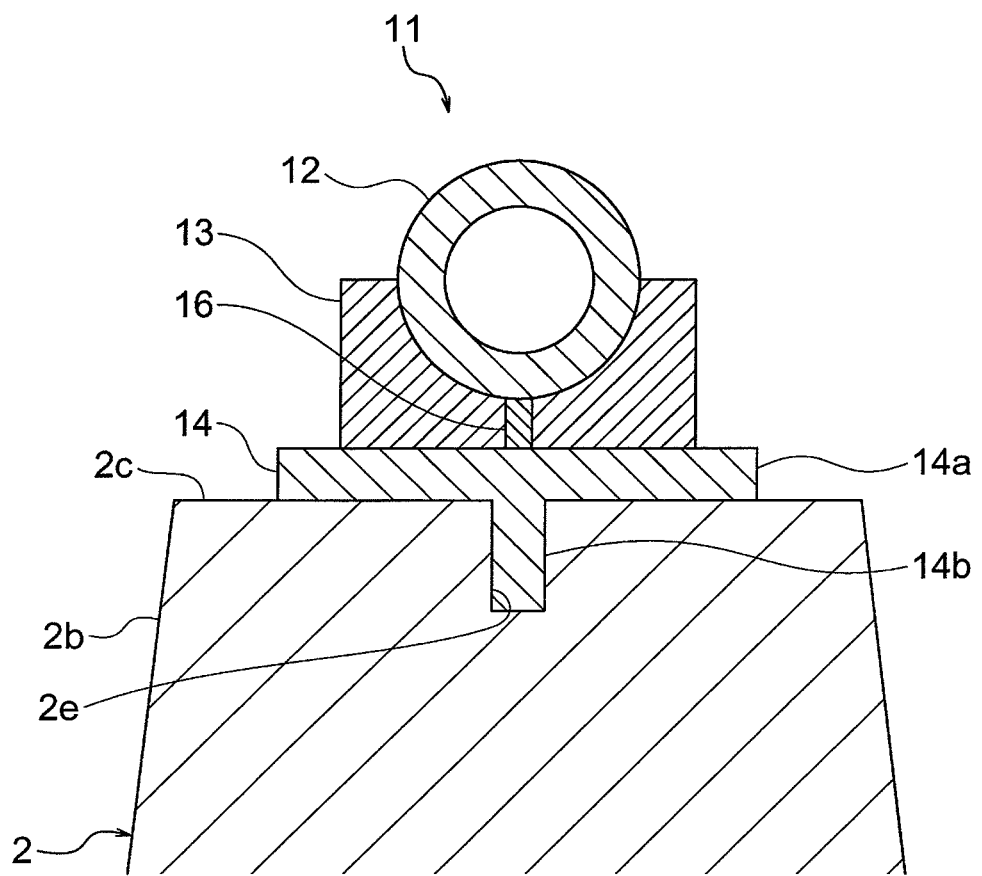
FIG. 6 is a cross-sectional view illustrating a variation example of the mounting portion shown in FIG. 2.

Further, in the mounting portions 11 and 311 of the first and third embodiments, the damping member 13 is formed so as to surround the outer circumferential surface 12a of the tubular member 12, but such configuration is not limiting. For example, as shown in FIG. 6, the damping member 13 may be provided only at the first fixing jig 14 side of the tubular member 12 so as to be interposed between the tubular member 12 and the first fixing jig 14 for preventing the direct contact therebetween.

Further, in the mounting portions 11, 211 and 311 of the first to third embodiments, the damping members 13, 213a and 213b are provided on the flat surfaces of the fixing jigs 14, 15 and 314, but such configuration is not limiting. The surface where the damping members 13, 213a and 213b are provided may be processed to form a rough surface, peaks and valleys, grooves, and the like. As a result, stronger joining of the fixing jigs 14, 15 and 314 and the damping members 13, 213a and 213b can be obtained.

Further, in the mounting portions 11, 211 and 311 of the first to third embodiments, the protruding press-fitted portions 14b, 15b and 314b are formed at the fixing jigs 14, 15 and 314, and receding the hole 2d, hole 2e, and groove 22d are formed at the housing 2, but such configuration is not limiting. The hole 2d, hole 2e, and groove 22d may be formed at the fixing jigs 14, 15 and 314, and the press-fitted portions 14b, 15b and 314b may be formed at the housing 2.

Further, in the mounting portions 11 and 211 of the first and second embodiments, the press-fitted portions 14b and 15b of the fixing jigs 14 and 15 have a round rod-like shape, but such configuration is not limiting. The press-fitted portions may have a shape with rectangular cross sections as the press-fitted portion 314b of the mounting portion 311 of the third embodiment.

Further, regarding the fixing jigs 14, 15 and 314 of the mounting portions 11, 211 and 311 of the first to third embodiments, from the standpoint of stabilizing the attachment of the mounting portions 11, 211 and 311 to the housing 2, it is preferred that the press-fitted portions 14b, 15b and 314b be provided such as to protrude from the center axis of the cylinder of the tubular member 12 in the radial outward direction, but the press-fitted portions may also be displaced from the abovementioned direction.

Further, in the first to third embodiments, the attachment surface 2c of the housing 2 is flat, but such configuration is not limiting. The attachment surface may be curved, or steps or peaks and valleys may be formed thereon. In such a case, the mounting portions 11, 211 and 311 can be fixed to the housing 2 by changing the shape of the fixing jigs 14, 15 and 314.

Further, the mounting portions 11, 211 and 311 of the first to third embodiments are provided at the motor-driven compressor attached to the engine 61 installed on a vehicle, but such configuration is not limiting. The mounting portions may also be provided at a motor-driven compressor mounted to a driving electric motor in a fuel cell vehicle or an electric automobile. Further, the motor-driven compressor to which the present invention can be applied is not limited to a refrigerant compressor of a refrigeration circuit, and the present invention can be also applied to other motor-driven compressors. For example, the present invention may be applied to an air compressor that is used in an air suspension apparatus of a vehicle, a pump that is used for pumping hydrogen or air to a fuel cell stack in a fuel cell vehicle, etc.

What is claimed is:

1. A motor-driven compressor to be mounted to an attachment section of a vehicle, comprising:
   a housing including inside thereof a compression mechanism that is driven by electric power, compresses a fluid suctioned from outside, and then discharges the compressed fluid; and
   a mounting portion for mounting the housing to the attachment section, wherein
   the mounting portion includes:
   a tubular body;
   a damping member provided integrally with the tubular body and formed from a resin;
   a fixing member provided integrally with the damping member and mounting the integrated tubular body and damping member to the housing; and
   a fastening member inserted into the tubular body for mounting the tubular body to the attachment section, and wherein
   the damping member is provided to be interposed between the tubular body and the fixing member, and
   the fixing member is provided to be interposed between the housing and the damping member, and
   the housing has a recess that is recessed into an outer surface of the housing,
   the fixing member has a support portion where the damping member is provided and a protruding portion that protrudes from the support portion in a direction away from the damping member and the tubular body, the protruding portion being configured to fit into the recess of the outer surface of the housing, and
   the fixing member is mounted to the housing by press fitting of the whole protruding portion into the recess of the outer surface of the housing, while the support portion contacts the outer surface of the housing and the damping member,
   wherein the support portion and the protruding portion are made of metal.

2. The motor-driven compressor according to claim 1, wherein
the resin forming the damping member has a vibration damping property superior to a vibration damping property of a material forming the housing.

3. The motor-driven compressor according to claim 1, wherein
the tubular body is made from a metal, and the tubular body supports a fastening force created by the fastening member between the attachment section and the fastening member.

4. The motor-driven compressor according to claim 1, wherein
the damping member is provided on the tubular body so as to be movable in an axial direction of the tubular body.

5. The motor-driven compressor according to claim 1, wherein
the mounting portion has a conductive member that is flexible and conductive and electrically connects the tubular body and the fixing member.

6. The motor-driven compressor according to claim 1, wherein
the damping member is formed from the resin with a flexural modulus of 100 MPa to 10,000 MPa.

7. The motor-driven compressor according to claim 1, wherein
an end portion of the tubular body in an axial direction thereof protrudes beyond the end portion of the damping member in the axial direction of the tubular body, and a space is provided between an end face of the damping member and a surface of the attachment section facing the end face of the damping member.

8. A motor-driven compressor to be mounted to an attachment section of a vehicle, comprising:
a housing including inside thereof a compression mechanism that is driven by electric power, compresses a fluid suctioned from outside, and then discharges the compressed fluid; and
a mounting portion for mounting the housing to the attachment section, wherein
the mounting portion includes:
a tubular body;
a damping member provided integrally with the tubular body and formed from a resin;
a fixing member provided integrally with the damping member and mounting the integrated tubular body and damping member to the housing; and
a fastening member inserted into the tubular body for mounting the tubular body to the attachment section, and wherein
the damping member is provided to be interposed between the tubular body and the fixing member, and
the fixing member is provided to be interposed between the housing and the damping member, and
the housing has a recess that is recessed into an outer surface of the housing,
the fixing member has a support portion where the damping member is provided and a protruding portion that protrudes from a central region of the support portion in a direction away from the damping member and the tubular body, the protruding portion being configured to fit into the recess of the outer surface of the housing, and
the fixing member is mounted to the housing by press fitting of the protruding portion into the recess, while the support portion contacts the outer surface of the housing and the damping member,
wherein the support portion and the protruding portion are made of metal.

9. A motor-driven compressor to be mounted to an attachment section of a vehicle, comprising:
a housing including inside thereof a compression mechanism that is driven by electric power, compresses a fluid suctioned from outside, and then discharges the compressed fluid; and
a mounting portion for mounting the housing to the attachment section, wherein
the mounting portion includes:
a tubular body;
a damping member provided integrally with the tubular body and formed from a resin;
a fixing member provided integrally with the damping member and mounting the integrated tubular body and damping member to the housing; and
a fastening member inserted into the tubular body for mounting the tubular body to the attachment section, wherein the fastening member does not penetrate through the housing, and wherein further
the damping member is provided to be interposed between the tubular body and the fixing member, and
the fixing member is provided to be interposed between the housing and the damping member, and
the housing has a recess that is recessed into an outer surface of the housing,
the fixing member has a support portion where the damping member is provided and a protruding portion that protrudes from the support portion in a direction away from the damping member and the tubular body, the protruding portion being configured to fit into the recess of the outer surface of the housing, and
the fixing member is mounted to the housing by press fitting of the protruding portion into the recess, while the support portion contacts the outer surface of the housing and the damping member,
wherein the support portion and the protruding portion are made of metal.

* * * * *